(12) United States Patent
Oh et al.

(10) Patent No.: US 8,349,499 B2
(45) Date of Patent: Jan. 8, 2013

(54) ELECTROLYTE FOR RECHARGEABLE LITHIUM BATTERY AND RECHARGEABLE LITHIUM BATTERY INCLUDING THE SAME

(75) Inventors: Mi-Hyeun Oh, Yongin-si (KR); Jin-Sung Kim, Yongin-si (KR); Na-Rae Park, Yongin-si (KR); Su-Hee Han, Yongin-si (KR); Jin-Hyunk Lim, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 12/876,897

(22) Filed: Sep. 7, 2010

(65) Prior Publication Data

US 2011/0123870 A1    May 26, 2011

(30) Foreign Application Priority Data

Nov. 26, 2009   (KR) .................. 10-2009-0115325

(51) Int. Cl.
*H01M 10/26* (2006.01)
(52) U.S. Cl. ........................ 429/326; 429/207
(58) Field of Classification Search ............. 429/231.95, 429/326, 207
See application file for complete search history.

(56) References Cited

U.S. PATENT DOCUMENTS

| | | | | |
|---|---|---|---|---|
| 7,572,554 | B2 * | 8/2009 | Koike et al. ............... | 429/329 |
| 2009/0098456 | A1 * | 4/2009 | Park et al. ................. | 429/200 |
| 2010/0183926 | A1 | 7/2010 | Kim et al. | |

FOREIGN PATENT DOCUMENTS

| | | |
|---|---|---|
| JP | 2007-123097 | 5/2007 |
| JP | 2009-176534 A | 8/2009 |
| JP | 2009-245888 A | 10/2009 |
| KR | 1020050063915 A | 6/2005 |
| KR | 1020080000595 A | 1/2008 |
| KR | 1020080097599 A | 11/2008 |
| KR | 1020090053467 A | 5/2009 |
| KR | 10-2010-0086370 A | 7/2010 |

OTHER PUBLICATIONS

KIPO Office Action dated Jul. 29, 2011, 5 pages.
Korean Notice of Allowance issued by the Korean Patent Office, dated Mar. 15, 2012, 5 pages.

* cited by examiner

*Primary Examiner* — Jennifer K Michener
*Assistant Examiner* — Monique Wills
(74) *Attorney, Agent, or Firm* — Knobbe Martens Olson & Bear LLP

(57) ABSTRACT

An electrolyte for a rechargeable lithium battery, including a lithium salt, an organic solvent, lithium bis(oxalato)borate (LiBOB), and at least one kind of tris(trialkylsilyl)borate represented by following Chemical Formula 1.

[Chemical Formula 1]

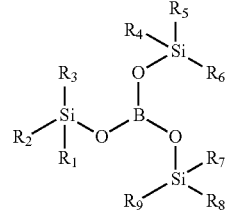

In the above Chemical Formula 1, $R_1$ to $R_9$ are the same as described in the detailed description.

7 Claims, 2 Drawing Sheets

ELECTROLYTE FOR RECHARGEABLE LITHIUM BATTERY AND RECHARGEABLE LITHIUM BATTERY INCLUDING THE SAME

CROSS-REFERENCE TO RELATED APPLICATIONS

This application claims the benefit of Korean Patent Application No. 10-2009-0115325, filed Nov. 26, 2009 in the Korean Intellectual Property Office, the disclosure of which is incorporated herein, by reference.

BACKGROUND

1. Field

This disclosure relates to an electrolyte for a rechargeable lithium battery and a rechargeable lithium battery including the same.

2. Description of the Related Technology

A battery is a device that stores and releases electrical energy, via the electrochemical oxidation and reduction of chemical materials therein. A battery may be a primary battery, which is not rechargeable, or a secondary battery, which is rechargeable.

A conventional rechargeable lithium battery includes a lithium mixed-metal oxide as a positive active material, metallic lithium and the like as a negative active material, and an electrolyte prepared by dissolving a lithium salt in an organic solvent. In particular, the electrolyte for a rechargeable lithium battery is representatively prepared by dissolving a lithium salt, such as $LiPF_6$, in an organic solvent, such as a mixture of a cyclic carbonate, such as ethylene carbonate (EC), and a linear carbonate, such as dimethylcarbonate (DMC), ethylmethylcarbonate (EMC), or diethyl carbonate (DEC). The electrolyte has a significant influence on performance of a rechargeable lithium battery.

As portable electronic devices have gained popularity, the need for higher performance secondary batteries has grown. Accordingly, research is being conducted on improving electrolytes, in order to increase battery performance and power density.

SUMMARY OF CERTAIN INVENTIVE ASPECTS

According to an exemplary embodiment of the present disclosure, provided is an electrolyte and a rechargeable lithium battery including the same, having improved cycle-life characteristics at high voltages.

According to an exemplary embodiment of the present disclosure, provided is an electrolyte for a rechargeable lithium battery, including a lithium salt, an organic solvent, lithium bis(oxalato)borate, and at least one tris(trialkylsilyl)borate represented by the following Chemical Formula 1.

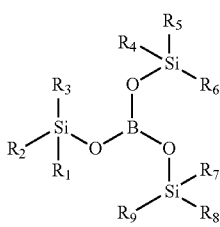

[Chemical Formula 1]

In the above Chemical Formula 1, R1 to R9 are independently selected from a C1 to C6 alkyl group, a C1 to C6 heteroalkyl group, and a C1 to C6 perfluoroalkyl group.

According to an exemplary embodiment of the present disclosure, the tris(trimethylsilyl)borate may be represented by the following Chemical Formula 2.

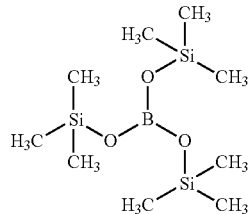

[Chemical Formula 2]

According to various embodiments, the electrolyte include the lithium bis(oxalato)borate in an amount of 0.1 to 2.5 wt %, based on the total weight of the electrolyte, and the tris(trialkylsilyl)borate in an amount of 0.1 to 1.5 wt %, based on the total weight of the electrolyte.

According to various embodiments, the lithium bis(oxalato)borate and the tris(trialkylsilyl)borate may have a weight ratio ranging from 1:1 to 4:1.

According to various embodiments, the electrolyte may further include a halogenated carbonate compound.

According to some embodiments, provided is a rechargeable lithium battery including a positive electrode including a positive active material, a negative electrode including a negative active material, and the electrolyte.

According to various embodiments, the positive active material may be selected from the group consisting of $LiCoO_2$, a nickel-cobalt-manganese composite, and a combination thereof.

According to various embodiments, the rechargeable lithium battery has an excellent cycle-life at a high voltage.

Additional aspects and/or advantages of the present disclosure will be set forth in part in the description which follows and, in part, will be obvious from the description, or may be learned by practice of the present teachings.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which.

DETAILED DESCRIPTION OF CERTAIN INVENTIVE EMBODIMENTS

Figure 1:
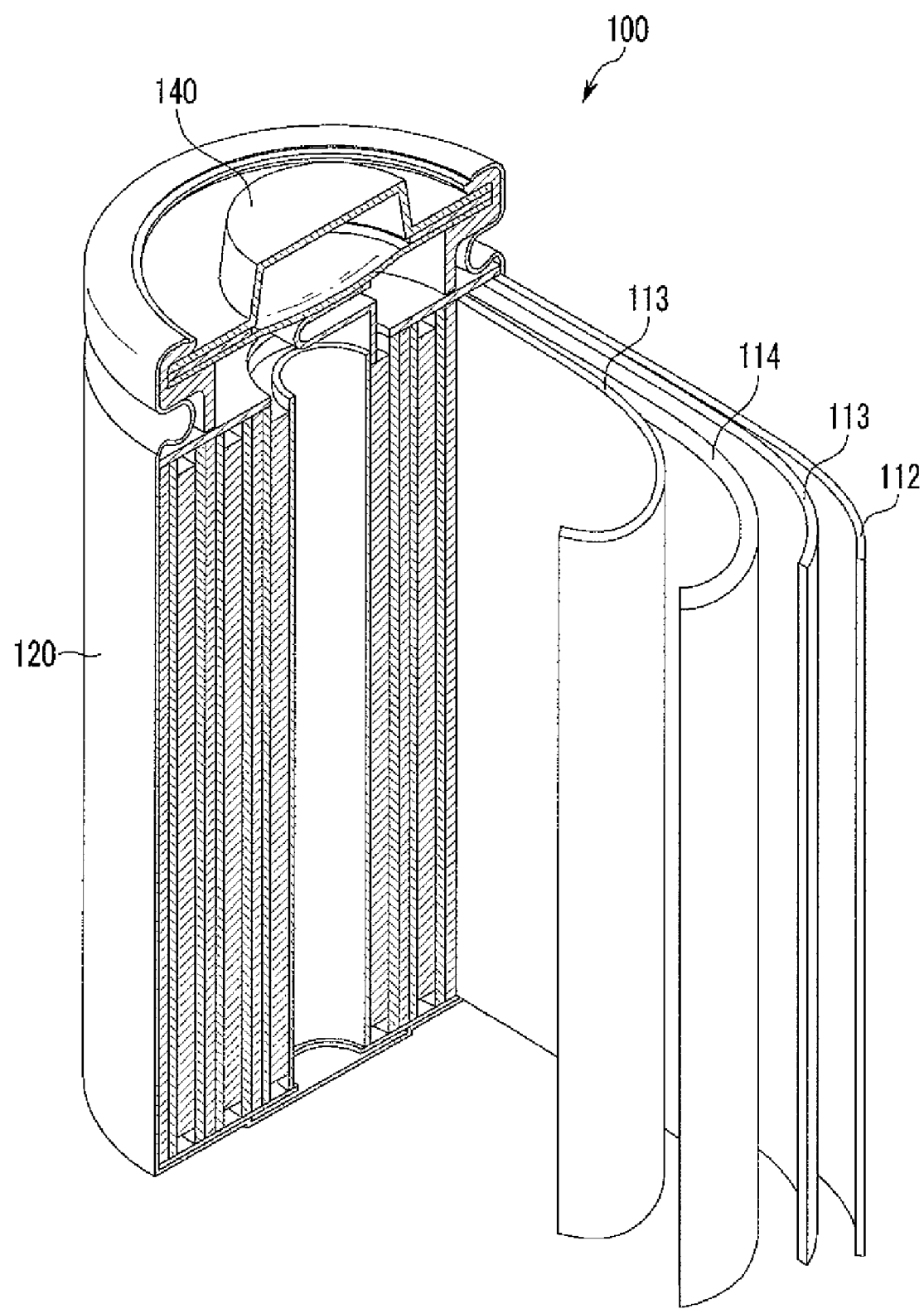
FIG. 1 is a schematic diagram showing a rechargeable lithium battery according to an exemplary embodiment of the present disclosure.

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

According to one exemplary embodiment, an electrolyte for a rechargeable lithium battery may include a lithium salt; an organic solvent; lithium bis(oxalato)borate (LiBOB); and at least one tris(trialkylsilyl)borate represented by following Chemical Formula

[Chemical Formula 1]

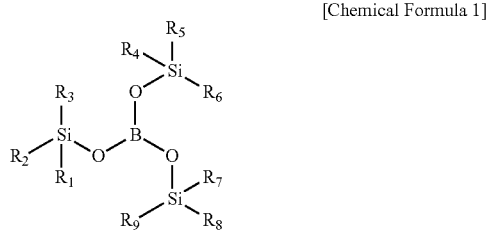

In the above Chemical Formula 1, R1 to R9 are independently selected from a C1 to C6 alkyl group, a C1 to C6 heteroalkyl group, and a C1 to C6 perfluoroalkyl group.

The lithium salt is dissolved in an organic solvent and is a source of lithium ions. It also promotes movement of lithium ions between positive and negative electrodes. Examples of the lithium salt may include one or more selected from the group consisting of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiCF_3SO_3$, $LiC_4F_9SO_3$, $LiC_6H_5SO_3$, LiSCN, $LiClO_4$, $LiAlO_2$, $LiAlCl_4$, $LiN(C_xF_{2x+1}SO_2)(C_yF_{2y+1}SO_2)$ (where, x and y are natural numbers), LiCl, LiI, $LiB(C_2O_4)_2$, and (lithium bis(oxalato)borate (LiBOB). The lithium salt may have a concentration ranging from 0.1 to 2.0 M. When it has a concentration within the range, an electrolyte may have appropriate conductivity and viscosity and thus, excellent performance.

The organic solvent serves as a medium for lithium ion transfer. The organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. Examples of the ester-based solvent may include methyl acetate, ethyl acetate, n-propyl acetate, dimethyl acetate, methyl propinonate, ethyl propinonate, γ-butyrolactone, decanolide, valero lactone, mevalonolactone, caprolactone, and the like. Examples of the ether-based solvent include dibutyl ether, tetraglyme, diglyme, 1,2-dimethoxy ethane, 1,2-diethoxy ethane, ethoxymethoxy ethane, 2-methyltetrahydrofuran, tetrahydrofuran, and the like, and examples of the ketone-based solvent include cyclohexanone, and the like. Examples of the alcohol-based solvent include ethanol, isopropyl alcohol, and the like, and examples of the aprotic solvent include nitriles such as R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The organic solvents may be used singularly or in a mixture. When the organic solvents are used in a mixture, the mixture ratio can be controlled in accordance with a desirable battery performance.

The carbonate-based solvent may include a mixture of a cyclic carbonate and a linear carbonate. The cyclic carbonate and the linear carbonate are mixed together in a volume ratio of 1:1 to 1:9, which results in improved electrolyte performance.

The electrolyte, according to one exemplary embodiment, may further include mixtures of carbonate-based solvents and aromatic hydrocarbon-based solvents. The carbonate-based solvents and the aromatic hydrocarbon-based solvents may be mixed together in a volume ratio of 1:1 to 30:1.

The aromatic hydrocarbon-based organic solvent may include an aromatic hydrocarbon-based compound. The aromatic hydrocarbon-based compound may include, but is not limited to, at least one selected from benzene, fluoro benzene, 1,2-difluoro benzene, 1,3-difluoro benzene, 1,4-difluoro benzene, 1,2,3-trifluoro benzene, 1,2,4-trifluoro benzene, chloro benzene, 1,2-dichloro benzene, 1,3-dichloro benzene, 1,4-dichloro benzene, 1,2,3-trichloro benzene, 1,2,4-trichloro benzene, iodo benzene, 1,2-diiodo benzene, 1,3-diiodo benzene, 1,4-diiodo benzene, 1,2,3-triiodo benzene, 1,2,4-triiodo benzene, toluene, fluoro toluene, 1,2-difluoro toluene, 1,3-difluoro toluene, 1,4-difluoro toluene, 1,2,3-trifluoro toluene, 1,2,4-trifluoro toluene, chloro toluene, 1,2-dichloro toluene, 1,3-dichloro toluene, 1,4-dichloro toluene, 1,2,3-trichloro toluene, 1,2,4-trichloro toluene, iodo toluene, 1,2-diiodo toluene, 1,3-diiodo toluene, 1,4-diiodo toluene, 1,2,3-triiodo toluene, 1,2,4-triiodo toluene, xylene, and a combination thereof.

The electrolyte for a rechargeable lithium battery may simultaneously include the lithium bis(oxalato)borate and at least one type of tris(trialkylsilyl)borate. The tris(trialkylsilyl)borate may be represented by Chemical Formula 1, above. In some aspects, the tris(trimethylsilyl)borate may be represented by the following Chemical Formula 2.

[Chemical Formula 2]

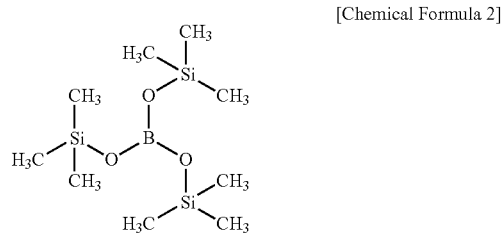

When the lithium bis(oxalato)borate and the tris(trialkylsilyl)borate are included in an electrolyte of a rechargeable lithium battery, the electrolyte can prevent the battery from being deteriorated at a high voltage and can help the battery maintain capacity after several charges and discharges. Accordingly, the battery may have excellent cycle-life at a high voltage.

The lithium bis(oxalato)borate may be included in an amount of 0.1 to 2.5 wt %, or 0.5 to 2.3 wt %, based on the total weight of the electrolyte. The tris(trialkylsilyl)borate may be included in an amount of 0.1 to 1.5 wt %, or 0.3 to 1.3 wt %, based on the total weight of the electrolyte. When included within these ranges, these elements can improve the cycle-life of a rechargeable lithium battery.

The lithium bis(oxalato)borate and the tris(trialkylsilyl)borate are included in a weight ratio ranging from 1:1 to 4:1, in the electrolyte. When they are included in the above weight ratios, they can improve cycle-life of a rechargeable lithium battery.

The electrolyte may further include a halogenated carbonate compound. The halogenated carbonate compound is an additive to improve the performance of an electrolyte and, for example, may include fluoroethylene carbonate (FEC), and the like.

The halogenated carbonate compound may be included in an amount of about 0.1 to 10 wt %, based on the total weight of the electrolyte. When it is included within the range, it may improve the long-term cycle-life characteristics of a battery.

FIG. 1 is a schematic view of a rechargeable lithium battery 100, according to an exemplary embodiment of the present disclosure. Referring to FIG. 1, the rechargeable lithium battery 100 includes a positive electrode 114, an opposing negative electrode 112, a separator 113 interposed therebetween, the electrolyte (not shown), a battery case 120, and a sealing member 140 to seal the battery case 120.

The positive electrode 114 includes a current collector and a positive active material layer disposed on the current collector. The current collector may be made of aluminum (Al) but is not limited thereto.

The positive active material layer may include a positive active material, a binder, and a conductive material. The positive active material may include a compound that can intercalate and de-intercalate lithium (lithiated intercalation compound). In particular, it may include composite oxides of lithium and a metal selected from the group consisting of cobalt, manganese, nickel, and a combination thereof. For example, the composite oxide may be any compound represented by one of the following Chemical Formulae.

$Li_aA_{1-b}X_bD_2$ ($0.90 \leq a \leq 1.8$, $0 \leq b \leq 0.5$), $Li_aE_{1-b}X_bO_{2-c}D_c$ ($0.90 \leq a \leq 1.8$, $0 \leq b \leq 0.5$, $0 \leq c \leq 0.05$), $LiE_{2-b}X_bD_4$ ($0 \leq b \leq 0.5$), $LiE_{2-b}X_bO_{4-c}D_c$ ($0 \leq b \leq 0.5$, $0 \leq c \leq 0.05$), $Li_aNi_{1-b-c}Co_bX_cD_\alpha$ ($0.90 \leq a \leq 1.8$, $0 \leq b \leq 0.5$, $0 \leq c \leq 0.05$, $0 \leq \alpha \leq 2$), $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$), $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$), $Li_aNi_{1-b-c}Co_bX_cD_\alpha$ ($0.90 \leq a \leq 1.8$, $0 \leq b \leq 0.5$, $0 \leq c \leq 0.05$, $0 \leq \alpha \leq 2$), $Li_aNi_{1-b-c}Mn_bX_cO_{2-\alpha}T_\alpha$ ($0.90 \leq a \leq 1.8$, $0 \leq b = 0.5$, $0 \leq c \leq 0.05$, $0 \leq \alpha \leq 2$), $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$), $Li_aNi_bE_cG_dO_2$ ($0.90 \leq a \leq 1.8$, $0 \leq b \leq 0.9$, $0 \leq c \leq 0.5$, $0.001 \leq d \leq 0.1$), $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$, $0.001 \leq e \leq 0.1$), $Li_aNiG_bO_2$ ($0.90 \leq a \leq 1.8$, $0.001 \leq b \leq 0.1$), $Li_aCoG_bO_2$ ($0.90 \leq a \leq 1.8$, $0.001 \leq b \leq 0.1$), $Li_aMnG_bO_2$ ($0.90 \leq a \leq 1.8$, $0.001 \leq b \leq 0.1$), $Li_aMn_2G_bO_4$ ($0.90 \leq a \leq 1.8$, $0.001 \leq b \leq 0.1$), $QO_2$, $QS_2$, $LiQS_2$, $V_2O_5$, $LiV_2O_5$, $LiIO_2$, $LiNiVO_4$, $Li_{(3-f)}J_2(PO_4)_3$ ($0 \leq f \leq 2$), $Li_{(3-f)}Fe_2(PO_4)_3$ ($0 \leq f \leq 2$), or $LiFePO_4$.

In the above Chemical Formulae: A is Ni, Co, Mn, or a combination thereof X is Al, Ni, Co, Mn, Cr, Fe, Mg, Sr, V, a rare earth element, or a combination thereof; D is O, F, S, P, or a combination thereof; E is Co, Mn, or a combination thereof; T is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The compound may have a coating layer on the surface thereof, or may be mixed with another compound having a coating layer. The coating layer may include at least one coating element selected from Mg, Al, Co, K, Na, Ca, Si, Ti, V, Sn, Ge, Ga, B, As, Zr, and a mixture thereof. The element may be in the form of an oxide, a hydroxide, an oxyhydroxide, an oxycarbonate, or a hydroxyl carbonate. The compound may be amorphous or crystalline.

The coating layer may be formed by any suitable method that has no adverse influence on properties of the positive active material. For example, the method may include a coating method, such as spray coating, dipping, and the like. The coating methods are not illustrated in more detail, as they are well-known in the art.

The binder improves binding properties of the positive active material particles to one another and to a current collector. Examples of the binder include at least one selected from the group consisting of polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any suitable electrically conductive material may be used as the conductive material. Examples of the conductive material include: carbon-based materials, such as natural graphite, artificial graphite, carbon black, acetylene black, ketjen black, carbon fiber, and the like; metal-based material such as metal powder or metal fiber of copper, nickel, aluminum, silver, and the like; conductive polymer materials such as polyphenylene derivative; or mixtures thereof.

The positive electrode 114 is prepared by coating a positive active material slurry, prepared by mixing the positive active material, the binder, the conductive material, and the additive in a solvent, on a current collector. The method of manufacturing an electrode is similarly applied to the negative electrode 112. The solvent may include an N-methylpyrrolidone and the like, but is not limited thereto.

The negative electrode 112 may include a current collector a negative active material layer disposed on the current collector. The current collector may be made of a copper film, a nickel film, a stainless steel film, a titanium film, a nickel foam, or a polymer substrate coated with a conductive metal, but is not limited thereto.

The negative active material layer may include a negative active material, a binder, and a conductive material. The negative active material includes a material that reversibly intercalates lithium ions, lithium metal, a lithium metal alloy, a material being capable of doping lithium, or a transition metal oxide. Examples of the lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping lithium include Si, $SiO_x$ ($0 < x < 2$), an Si—X alloy (where X is an element selected from the group consisting of an alkali metal, an alkaline-earth metal, a group 13 element, a group 14 element, a transition element, a rare earth element, and a combination thereof, and is not Si), Sn, $SnO_2$, Sn—X alloy (where X is an element selected from the group consisting of an element selected from the group consisting of an alkali metal, an alkaline-earth metal, a group 13 element, a group 14 element, a transition element, a rare earth element, and a combination thereof, and is not Sn), and a mixture thereof. At least one of these materials may be mixed with $SiO_2$. The element X is Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include vanadium oxide, lithium vanadium oxide, and the like. The material that reversibly intercalates lithium ions includes a carbon material. The carbon material may be any generally-used carbon-based negative active material for a lithium ion rechargeable battery. Examples of the carbon material include crystalline carbon, amorphous carbon, and a mixture thereof. The crystalline carbon may be amorphous, sheet, flake, spherical, or fibrous, natural graphite or artificial graphite. The amorphous carbon may be a soft carbon (carbon obtained by sintering at a low temperature), a hard carbon (carbon obtained by sintering at a high temperature), mesophase pitch carbide, fired coke, and the like.

The binder and the conductive material may be the same as in the aforementioned positive active material layer. The separator 113 may be polyethylene, polypropylene, polyvinylidene fluoride, or multi-layers thereof, such as a polyethylene/polypropylene double-layered separator, a polyethylene/polypropylene/polyethylene triple-layered separator, and a polypropylene/polyethylene/polypropylene triple-layered separator.

Rechargeable lithium batteries may be classified as lithium ion batteries, lithium ion polymer batteries, and lithium polymer batteries, according to the presence of a separator and the kind of electrolyte used in the battery. Structures and fabricating methods for lithium ion batteries are well known in the art. The electrolyte is as recited above.

The following examples illustrate this disclosure in more detail. These examples, however, should not be interpreted as limiting the scope of this disclosure.

Preparation of an Electrolyte for a Rechargeable Lithium Battery

Preparation Example 1

An electrolyte for a rechargeable lithium battery was prepared by mixing 1 wt % of lithium bis(oxalato)borate (LIBOB) and 0.5 wt % of tris(trimethylsilyl)borate (TMSB), in an organic solvent including 1.4 M of $LiPF_6$ dissolved therein. The organic solvent includes ethylene carbonate (EC): ethylmethyl carbonate (EMC): dimethylcarbonate (DMC), in a ratio of 2:2:6.

Preparation Example 2

An electrolyte for a rechargeable lithium battery was prepared according to the same method as Preparation Example 1, except for including 2 wt % of lithium bis(oxalato)borate instead of 1 wt %.

Preparation Example 3

An electrolyte for a rechargeable lithium battery was prepared according to the same method as Preparation Example 1, except for including 0.5 wt % of tris(trimethylsilyl)borate instead of 1 wt %.

Preparation Example 4

An electrolyte for a rechargeable lithium battery was prepared according to the same method as Preparation Example 1, except for including 2 wt % of lithium bis(oxalato)borate (LIBOB) and 1 wt % of tris(trimethylsilyl)borate instead of 1 wt % of lithium bis(oxalato)borate and 0.5 wt % of tris(trimethylsilyl)borate.

Preparation Example 5

An electrolyte for a rechargeable lithium battery was prepared according to the same method as Preparation Example 1, except for including no lithium bis(oxalato)borate and tris(trimethylsilyl)borate.

Preparation Example 6

An electrolyte for a rechargeable lithium battery was prepared according to the same method as Preparation Example 1, except for including no lithium bis(oxalato)borate.

Preparation Example 7

An electrolyte for a rechargeable lithium battery was prepared according to the same method as Preparation Example 1, except for including no lithium bis(oxalato)borate and 1 wt % of tris(trimethylsilyl)borate instead of 0.5 wt %.

Preparation Example 8

An electrolyte for a rechargeable lithium battery was prepared according to the same method as Preparation Example 1, except for including no lithium bis(oxalato)borate and 2 wt % of tris(trimethylsilyl)borate instead of 0.5 wt %.

Preparation Example 9

An electrolyte for a rechargeable lithium battery was prepared according to the same method as Preparation Example 1 except for including no tris(trimethylsilyl)borate and 0.5 wt % of lithium bis(oxalato)borate instead of 1 wt %.

Preparation Example 10

An electrolyte for a rechargeable lithium battery was prepared according to the same method as Preparation Example 1, except for including no tris(trimethylsilyl)borate.

Preparation Example 11

An electrolyte for a rechargeable lithium battery was prepared according to the same method as Preparation Example 1, except for including no tris(trimethylsilyl)borate and 2 wt % of lithium bis(oxalato)borate instead of 1 wt %.

Preparation Example 12

An electrolyte for a rechargeable lithium battery was prepared according to the same method as Preparation Example 1, except for including no tris(trimethylsilyl)borate and 3 wt % of lithium bis(oxalato)borate instead of 1 wt %.

The electrolytes according to Examples 1 to 4 and Comparative Examples 1 to 8 are as follows.

TABLE 1

|  | TMSB [wt %] | LIBOB [wt %] |
| --- | --- | --- |
| Preparation Example 1 | 0.5 | 1 |
| Preparation Example 2 | 0.5 | 2 |
| Preparation Example 3 | 1 | 1 |
| Preparation Example 4 | 1 | 2 |
| Preparation Example 5 | — | — |
| Preparation Example 6 | 0.5 | — |
| Preparation Example 7 | 1 | — |
| Preparation Example 8 | 2 | — |
| Preparation Example 9 | — | 0.5 |
| Preparation Example 10 | — | 1 |
| Preparation Example 11 | — | 2 |
| Preparation Example 12 | — | 3 |

Fabrication of a Rechargeable Lithium Battery

Examples 1 to 4 and Comparative Examples 1 to 8

Twelve battery cells were fabricated by using $LiCoO_2$ and NiCoMn (nickel-cobalt-manganese composite) as a positive active material, artificial graphite as a negative active material, and a polyethylene film as a separator. The electrolytes according to Preparation Examples 1 to 4 were respectively injected, preparing rechargeable lithium batteries having a capacity of about 2,600 mAh, according to Examples 1 to 4, while the electrolytes according to Comparative Examples 1 to 8 were respectively injected to fabricate a rechargeable lithium batteries having capacity of about 2,600 mAh.

Property Evaluation

Cycle-Life

The rechargeable lithium batteries according to Examples 1 to 4 and Comparative Examples 1 to 8 were charged and discharged about 300 times (cycles). Then, their capacity % at the 100th cycle was measured and compared to the initial capacity and 2,600 mAh. The results are provided in the following Table 2. In addition, FIG. 2 shows a graph of their cycle-life characteristics.

TABLE 2

|  | 100$^{th}$ cycle capacity [mAh] | 100$^{th}$ cycle capacity ratio relative to initial capacity [%] | 100$^{th}$ cycle capacity ratio relative to 2,600 mAh [%] |
|---|---|---|---|
| Example 1 | 2430 | 97 | 96 |
| Example 2 | 2340 | 92 | 90 |
| Example 3 | 2417 | 95 | 93 |
| Example 4 | 2411 | 96 | 95 |
| Comparative Example 1 | 2261 | 90 | 87 |
| Comparative Example 2 | 2350 | 92 | 90 |
| Comparative Example 3 | 2400 | 95 | 92 |
| Comparative Example 4 | 1475 | 59 | 55 |
| Comparative Example 5 | 2224 | 87 | 85 |
| Comparative Example 6 | 2076 | 83 | 80 |
| Comparative Example 7 | 2059 | 82 | 80 |
| Comparative Example 8 | 1961 | 77 | 75 |

Figure 2:
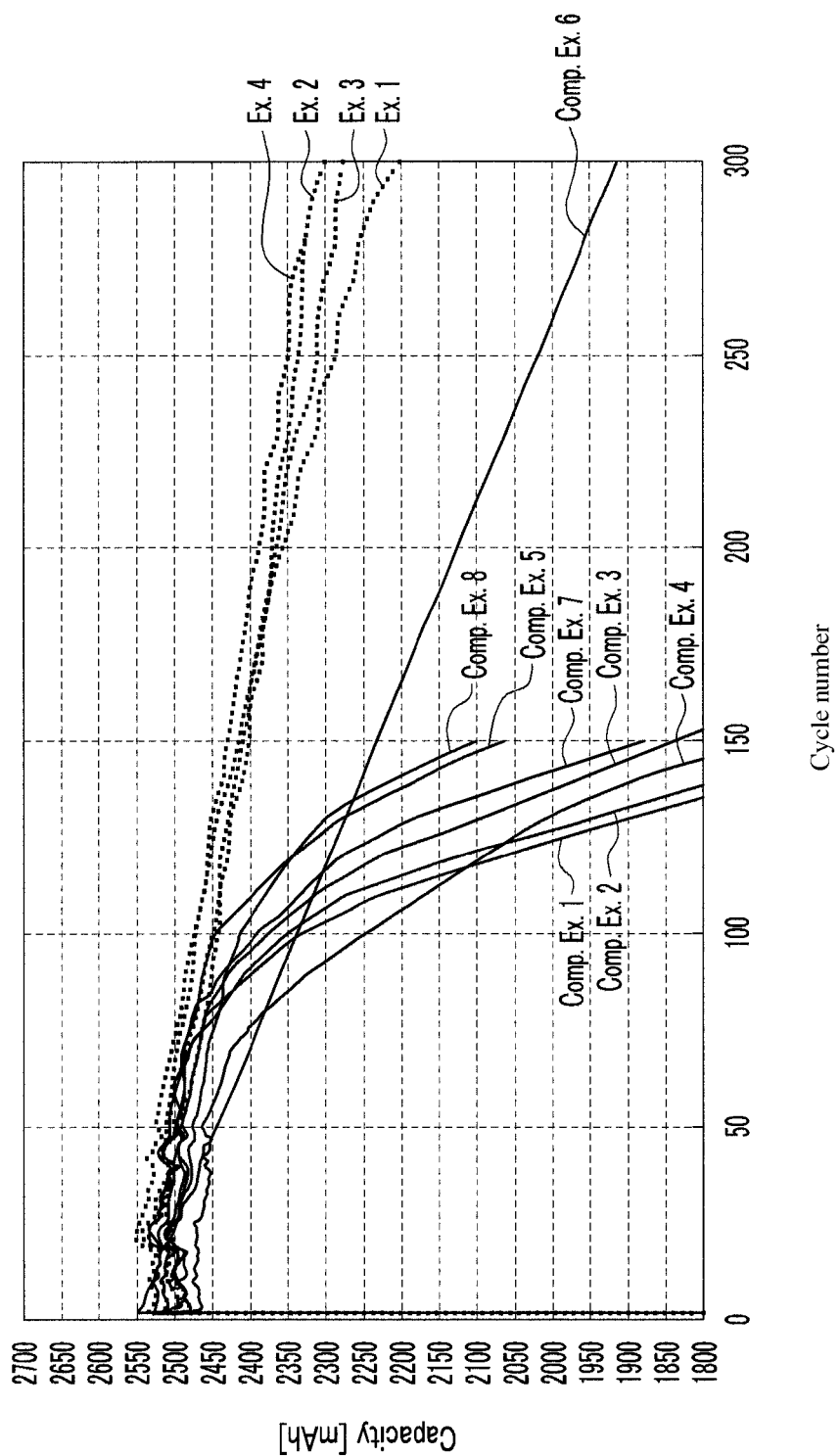
FIG. 2 is a graph showing cycle-life measurements of a rechargeable lithium battery, according to an exemplary embodiment of the present disclosure.

Referring to Table 2 and FIG. 2, the rechargeable lithium batteries including an electrolyte with neither of tris(trimethylsilyl)borate and lithium bis(oxalato)borate did not exhibit significant improvement in room temperature cycle-life characteristics, at a high voltage. In particular, the ones including an electrolyte including only tris(trimethylsilyl)borate in an amount of more than 2%, had a 59% decrease in 100th cycle capacity, with respect to initial capacity. When only lithium bis(oxalato)borate was included in an amount of more than 3%, the rechargeable lithium batteries had a 75% decrease in 100th cycle capacity, with respect to initial capacity. On the other hand, in Examples 1 to 4, where tris(trimethylsilyl)borate and lithium bis(oxalato)borate were used together, the rechargeable lithium batteries maintained more than 90% of 10th cycle capacity, with respect to initial capacity, and had stable cycle-life characteristics up to 300th cycle, with no sharp capacity drop off.

In other words, the rechargeable lithium batteries according to Examples 1 to 4 turned out to have excellent cycle-life characteristics at a high voltage, as compared with the batteries of Comparative Examples 1 to 8.

Although a few exemplary embodiments of the present disclosure have been shown and described, it would be appreciated by those skilled in the art that changes may be made in the exemplary embodiments, without departing from the principles and spirit of the present disclosure, the scope of which is defined in the claims and their equivalents.

What is claimed is:

1. An electrolyte for a rechargeable lithium battery comprising:
   a lithium salt;
   an organic solvent;
   lithium bis(oxalato)borate (LiBOB); and
   a tris(trialkylsilyl)borate represented by following Chemical Formula 1:

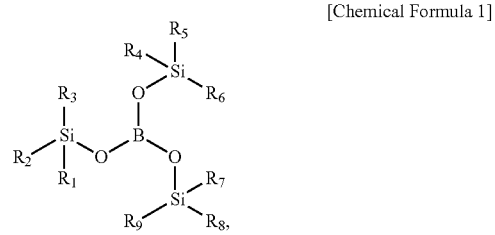

[Chemical Formula 1]

wherein in Chemical Formula 1, $R_1$ to $R_9$ are independently selected from a C1 to C6 alkyl group, a C1 to C6 heteroalkyl group, and a C1 to C6 perfluoroalkyl group,
   wherein the lithium bis(oxalato)borate and the tris(trialkylsilyl)borate are present in a weight ratio ranging from 1:1 to 4:1, respectively.

2. The electrolyte of claim 1, wherein the tris(trialkylsilyl)borate is represented by the following Chemical Formula 2:

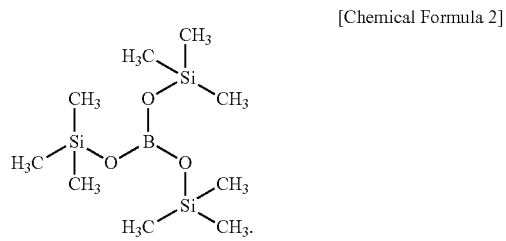

[Chemical Formula 2]

3. The electrolyte of claim 1, wherein:
   the lithium bis(oxalato)borate is present in an amount of from about 0.1 wt % to about 2.5 wt %, based on the total weight of the electrolyte; and
   the tris(trialkylsilyl)borate is present in an amount of from about 0.1 wt % to about 1.5 wt %, based on the total weight of the electrolyte.

4. The electrolyte of claim 1, further comprising a halogenated carbonate compound.

5. A rechargeable lithium battery comprising:
   a positive electrode comprising a positive active material;
   a negative electrode comprising a negative active material; and
   the electrolyte of claim 1.

6. The rechargeable lithium battery of claim 5, wherein the positive active material is selected from the group consisting of $LiCoO_2$, a nickel-cobalt-manganese composite compound, and a combination thereof.

7. The electrolyte of claim 1, wherein the electrolyte comprises at least two different types of the tris(trialkylsilyl)borate.

* * * * *